(12) United States Patent
Hemphill et al.

(10) Patent No.: US 10,801,237 B2
(45) Date of Patent: Oct. 13, 2020

(54) TRUCK TAILGATE WITH CHECK STRAP

(71) Applicant: FORD GLOBAL TECHNOLOGIES, LLC, Dearborn, MI (US)

(72) Inventors: Joshua R. Hemphill, White Lake, MI (US); Jack Marchlewski, Saline, MI (US); Dragan B. Stojkovic, Taylor, MI (US); Brian K. Sullivan, Plymouth, MI (US); Jeffrey Gray, Dearborn, MI (US); Robert Reiners, Grosse Ile, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 4 days.

(21) Appl. No.: 16/261,935

(22) Filed: Jan. 30, 2019

(65) Prior Publication Data

US 2020/0240184 A1 Jul. 30, 2020

(51) Int. Cl.
*E05C 17/36* (2006.01)
*B62D 33/027* (2006.01)

(52) U.S. Cl.
CPC .......... *E05C 17/36* (2013.01); *B62D 33/0273* (2013.01); *E05C 17/365* (2013.01); *E05Y 2201/224* (2013.01); *E05Y 2800/37* (2013.01); *E05Y 2900/546* (2013.01)

(58) Field of Classification Search
CPC ..... B62D 33/0273; B62D 33/03; E05C 17/36; E05C 17/365

USPC ......................................................... 296/57.1
See application file for complete search history.

(56) References Cited

U.S. PATENT DOCUMENTS

| 6,267,429 | B1 | 7/2001 | Kuzmich et al. |
| 6,450,559 | B1 | 9/2002 | Renke |
| 8,070,208 | B2 | 12/2011 | Zielinsky |
| 8,087,710 | B2 | 1/2012 | Zielinsky |
| 9,248,871 | B1 | 2/2016 | Waskie et al. |
| 9,956,995 | B1 | 5/2018 | Neighbors et al. |
| 2011/0163565 | A1* | 7/2011 | Zielinsky ........... B62D 33/0273 296/57.1 |
| 2018/0195332 | A1* | 7/2018 | Martins ..................... E05F 5/06 |

* cited by examiner

*Primary Examiner* — Jason S Morrow
(74) *Attorney, Agent, or Firm* — David Coppiellie; MacMillan, Sobanski & Todd, LLC

(57) ABSTRACT

A vehicle including a bed, and a tailgate, pivotally attached to the vehicle to close off a rear end of the bed, the tailgate having a front surface and a side with a pull tab recess. A check strap has a forward end attached to the bed and a rearward end; and an extension bracket has an extension plate pivotally connecting at a forward end to the rearward end of the check strap, a rear fastener pivotally securing the extension plate to the side of the tailgate, a pull tab extending through the extension plate and laterally slidable out of the pull tab recess, the extension plate extending essentially parallel to the front surface when the pull tab is received in the pull tab recess.

11 Claims, 3 Drawing Sheets

TRUCK TAILGATE WITH CHECK STRAP

BACKGROUND OF THE INVENTION

The present invention relates to a truck with a tailgate and more particularly to a tailgate having a check strap.

For trucks with tailgates, such as pickup trucks, in some instances the tailgate may be somewhat of a hindrance when lifting heavy or bulky objects into the bed of the truck. Even in the open (horizontal) position, the tailgate may create difficulties for one lifting a heavy object from the ground and inserting the object into the bed over the open tailgate. Such a situation may cause one to encounter difficulties reaching past the tailgate into the bed. Yet, for some uses, the tailgate maintaining a ninety degree open (horizontal) position is needed for support of cargo. Accordingly, it is desirable to ease the loading of heavy cargo into the bed of the truck while still allowing for the usefulness of a tailgate in a conventional open (horizontal) position.

SUMMARY OF THE INVENTION

An embodiment contemplates a vehicle including a bed; a tailgate, pivotally attached to the vehicle to close off a rear end of the bed, the tailgate having a front surface and a side with a pull tab recess; a check strap having a forward end attached to the bed and a rearward end; and an extension bracket having an extension plate pivotally connecting at a forward end to the rearward end of the check strap, a rear fastener pivotally securing the extension plate to the side of the tailgate, a pull tab extending through the extension plate and laterally slidable out of the pull tab recess, the extension plate extending essentially parallel to the front surface when the pull tab is received in the pull tab recess.

An embodiment contemplates a vehicle having a bed; a tailgate, pivotally attached to the vehicle, the tailgate having a front surface and a side with a pull tab recess; a check strap having a forward end attached to the bed and a rearward end; and an extension bracket having an extension plate with a fastener connecting a forward end of the extension plate to the rearward end of the check strap, a rear fastener pivotally securing the extension plate to the side of the tailgate, a pull tab extending through the extension plate and laterally slidable out of the pull tab recess, and a spring biasing the pull tab toward the side of the tailgate.

An advantage of an embodiment is that the tailgate can be employed in the conventional open (horizontal, i.e., ninety degrees from vertical) open position, while also allowing for ease in opening the tailgate farther, to a cargo load position, in order to assist with loading heavy cargo into the truck bed.

DETAILED DESCRIPTION

Figure 1:
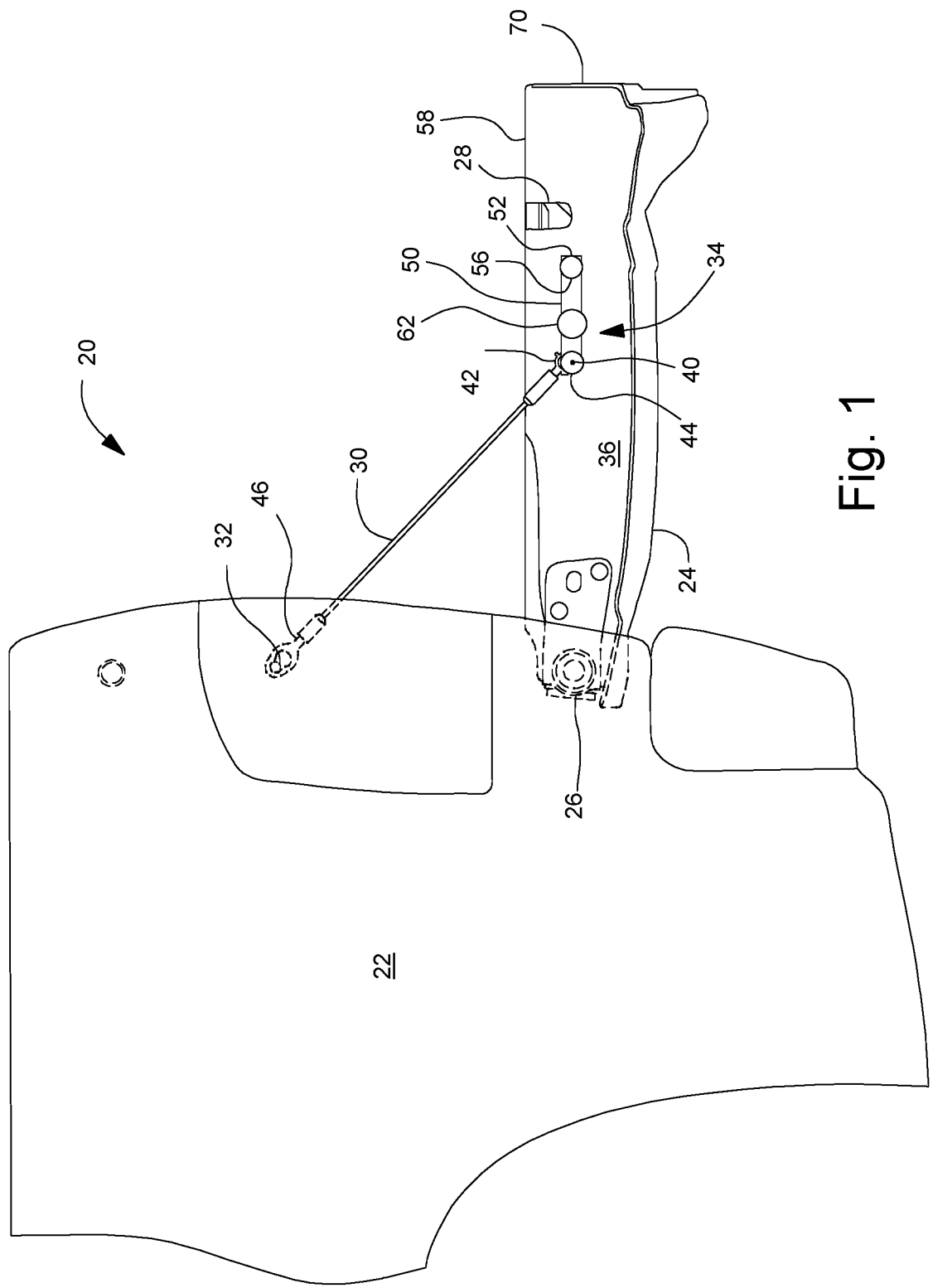
FIG. 1 is a schematic side view of a portion of a pickup truck with a tailgate in an open (horizontal) position.
Figure 2:
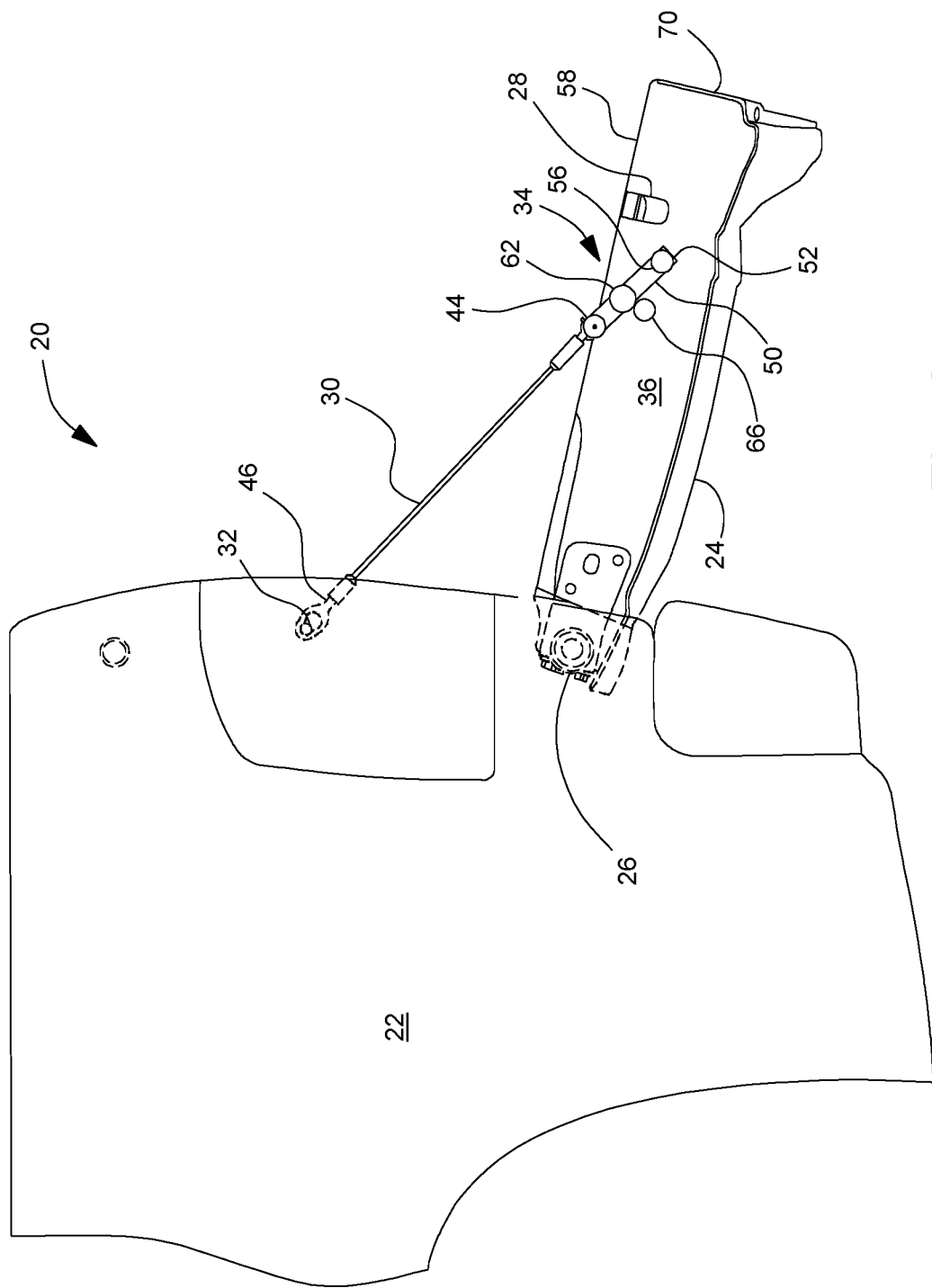
FIG. 2 is a schematic side view similar to FIG. 1, with the tailgate in a cargo loading position.
Figure 3:
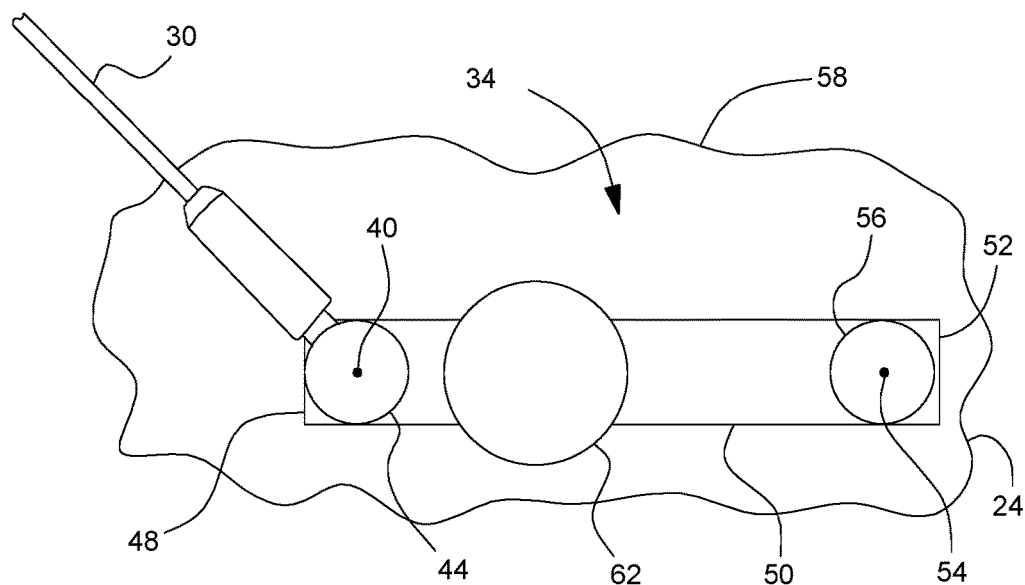
FIG. 3 is a schematic of a portion of a check strap assembly on a side of a tailgate
Figure 4:
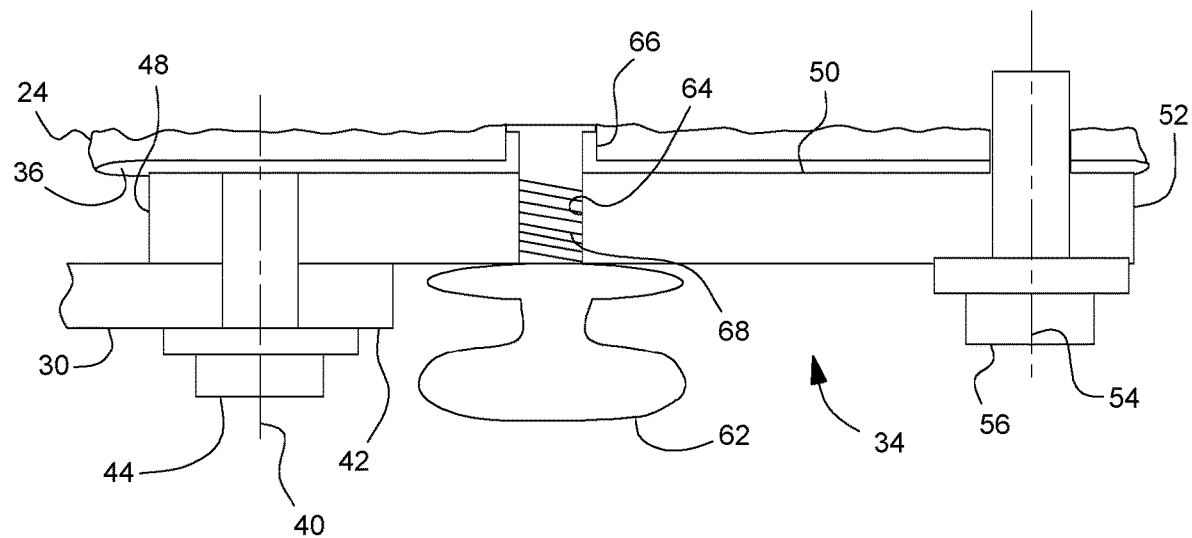
FIG. 4 is a schematic sectional view through a portion of the check strap assembly of FIG. 3.

FIGS. 1-4 illustrate a vehicle 20, such as a pickup truck, having a bed 22 to which a tailgate 24 is pivotally attached at a rear end of the bed 22. The tailgate 24 has horizontal hinges 26 about which it pivots between a closed (vertical) position (not shown) closing off the rear of the bed 22 and an open (horizontal) position (see FIG. 1) where the rear of the bed 22 is open and the tailgate 24 extends essentially parallel to a floor of the bed 22. As used herein, the tailgate "open position" means that the tailgate 24 is oriented essentially horizontal, with a front face 58 of the tailgate 24 essentially parallel to the floor of the bed 22. This open position, then, is generally ninety degrees from the tailgate closed (vertical) position. In this open position, the tailgate 24 may act as an extension of the floor of the bed 22 for longer cargo. Latches 28, which may be conventional and so will not be shown in detail herein, are located on opposite sides 36 of the tailgate and selectively secure to the bed 22 to hold the tailgate 24 in the closed (vertical) position.

A pair of check straps 30 extend between front ends 46, which are attached to and pivot about pivots 32 on the left and right sides of the bed 22, respectively, and rear ends 42, which are attached to and pivot about respective extension plates 50 of extension brackets 34 on opposed sides 36 of the tailgate 24. As used herein, "sides" of the tailgate 24 refer to lateral sides (i.e., left and right), as opposed to a front, back, top or bottom surface. While only one side of the truck 20 and tailgate 24 are illustrated in the drawings, the opposite side of the truck 20 and tailgate 24 may be a mirror image of the side shown and so will not be shown separately herein.

Each of the extension brackets 34 (only one shown as the opposite may be a mirror image of the first) create two different pivot axes for the corresponding extension bracket 34. A forward pivot axis 40 is where the rear end 42 of the corresponding check strap 30 attaches near the front of the extension plate 50 of the respective extension bracket 34. The rear end 42 of each check strap 30 may attach for pivoting about a fastener (such as for example a bolt) 44, which in turn attaches to a forward end 48 of the corresponding extension plate 50. When referring to the terms "forward" and "rearward" relative to the check straps and extension brackets, these terms are relative to the extension bracket orientation when the tailgate is in the open position.

A rear end 52 of each extension plate 50 is supported about a rear pivot axis 54, which may include a fastener (such as for example a bolt) 56 extending through the corresponding extension plate 50 and secured to the corresponding side 36 of the tailgate 24.

The two pivot axes 40, 54, for each side 36 of the tailgate 24, may be spaced approximately an equal distance from the front surface 58 of the tailgate 24. That is, in the tailgate closed position, the corresponding front and rear pivot axes 40, 54 are essentially directly vertical from each other, and in the tailgate open position (horizontal) (see FIG. 1), the forward pivot axis 40 is essentially horizontally directly in front of the corresponding rear pivot axis 54.

The extension brackets 34 each also include a pull tab 62 that extends through a hole 64 in the respective extension plate 50 into a recess 66 in the respective side 36 of the tailgate 24. Each pull tab 62 is slidable within the hole 64 and recess 66 to move the tab 62 laterally into and out of the corresponding recess 66. Each pull tab 62 may also mate with a corresponding spring 68 that biases the respective pull tab 62 toward the corresponding recess 66.

When in use, then, the tailgate 24 moves between the closed (vertical) position and the open position (see FIG. 1), with the springs 68 biasing the tabs 62 into the recesses 66. This holds the extension plates 50 essentially parallel to the front surface 58 of the tailgate 24, thus the rear ends 42 of the straps 30 pivot about the forward pivot locations 40.

If one wishes to load cargo, then, from the open position (FIG. 1), one pulls laterally outward on the pull tabs 62. This releases the pull tabs 62 from the sides 36 of the tailgate 24, thus freeing the extension plates 50 to pivot about the fasteners 56 at the rear pivot locations 54. With the extension plates 50 free to pivot, the extension plates 50 will pivot to extend in line with the check straps 30, thus allowing the tailgate 24 to pivot downward farther to a cargo load position (see FIG. 2). As used herein, the tailgate "cargo load position" means that the tailgate 24 is oriented beyond horizontal, with a front face 58 of the tailgate 24 extending downward from the floor of the bed 22. This cargo load position, then, is greater than ninety degrees from the tailgate closed (vertical) position. In this cargo load position, the rear end (top) 70 of the tailgate 24 is closer to the ground than the end of the tailgate 24 with the hinges 26. Having this lowered rear end 70 may allow for easier loading and unloading of heavy cargo from the bed 22.

When one wishes to again move the tailgate 24 between the closed and open positions (after opening to the cargo load position), one merely lifts the tailgate to allow the pull tabs 62 to align with the recesses 66, at which point the springs 68 will push the tabs 62 into the recesses 66.

While certain embodiments of the present invention have been described in detail, those familiar with the art to which this invention relates will recognize various alternative designs and embodiments for practicing the invention as defined by the following claims.

The invention claimed is:

1. A vehicle comprising:
    a bed;
    a tailgate, pivotally attached to the vehicle to close off a rear end of the bed, the tailgate having a front surface and a side with a pull tab recess;
    a check strap having a forward end attached to the bed and a rearward end; and
    an extension bracket having an extension plate pivotally connecting at a forward end to the rearward end of the check strap, a rear fastener pivotally securing the extension plate to the side of the tailgate, a pull tab extending through the extension plate and laterally slidable out of the pull tab recess, the extension plate extending essentially parallel to the front surface when the pull tab is received in the pull tab recess.

2. The vehicle of claim 1 wherein the extension bracket includes a spring biasing the pull tab toward the side of the tailgate.

3. The vehicle of claim 2 wherein, the rearward end of the check strap is fastened to the forward end of the extension plate, and when the pull tab is received in the pull tab recess, the rearward end of the check strap pivots about the forward end of the extension plate.

4. The vehicle of claim 3 wherein, when the pull tab is not in the pull tab recess a rearward end of the extension plate pivots about the rear fastener.

5. The vehicle of claim 2 wherein, when the pull tab is not in the pull tab recess the rearward end of the extension plate pivots about the rear fastener.

6. The vehicle of claim 1 wherein, the rearward end of the check strap is fastened to the forward end of the extension plate, and when the pull tab is received in the pull tab recess, the rearward end of the check strap pivots about the forward end of the extension plate.

7. The vehicle of claim 6 wherein, when the pull tab is not in the pull tab recess a rearward end of the extension plate pivots about the rear fastener.

8. A vehicle comprising:
    a bed;
    a tailgate, pivotally attached to the vehicle, the tailgate having a front surface and a side with a pull tab recess;
    a check strap having a forward end attached to the bed and a rearward end; and
    an extension bracket having an extension plate with a fastener connecting a forward end of the extension plate to the rearward end of the check strap, a rear fastener pivotally securing the extension plate to the side of the tailgate, a pull tab extending through the extension plate and laterally slidable out of the pull tab recess, and a spring biasing the pull tab toward the side of the tailgate.

9. The vehicle of claim 8 wherein, when the pull tab is received in the pull tab recess, the rearward end of the check strap pivots about the forward end of the extension plate.

10. The vehicle of claim 9 wherein, when the pull tab is not in the pull tab recess a rearward end of the extension plate pivots about the rear fastener.

11. The vehicle of claim 8 wherein, when the pull tab is not in the pull tab recess a rearward end of the extension plate pivots about the rear fastener.

* * * * *